Patented Sept. 15, 1942

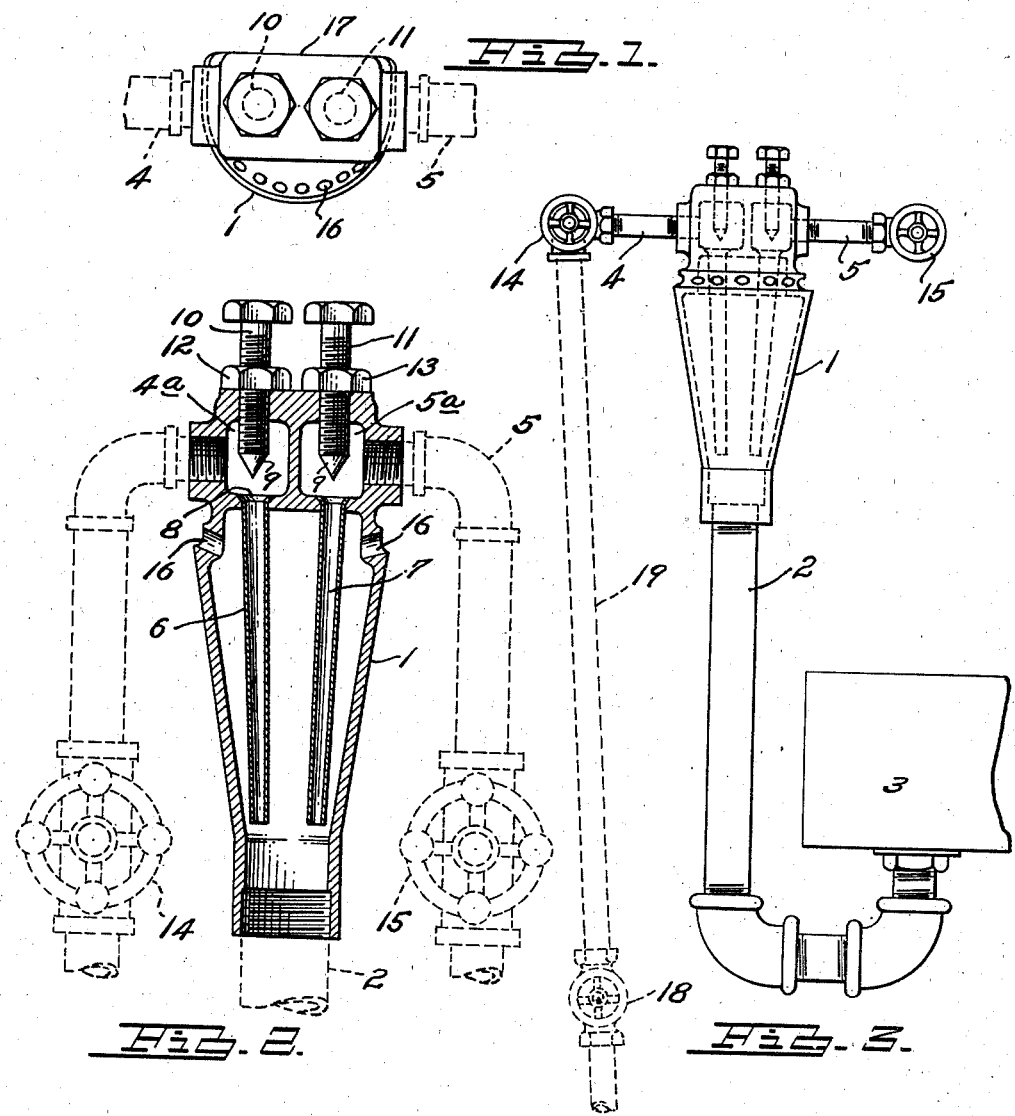

2,295,986

UNITED STATES PATENT OFFICE 2,295,986

VACUUM BREAKER FOR WATER SYSTEMS

Edward W. N. Boosey, Detroit, Mich.

Application July 6, 1940, Serial No. 344,284

2 Claims. (Cl. 137—69)

This invention relates to vacuum breakers for use in conjunction with plumbing fixtures having submerged water inlets, the object being to prevent the water in the supply conduit from being contaminated by syphonage from the fixture, as may occur by the opening of the valve in the connected water supply line below the fixture whose inlet is below the liquid level in the fixture.

It is further an object and feature of the invention to provide a vacuum breaker having an inlet chamber to which the water supply line is connected, a chamber therebelow having an opening or openings at its upper end to atmosphere and a valve controlled tube providing an outlet for the said chamber and extending into the said body to a distance below the said openings to atmosphere.

It is further an object and feature of the invention to provide a vacuum breaker having two chambers to which a cold and a hot water supply line may be respectively connected each of which chamber has a tube providing an outlet leading from the said respective chambers into a hollow body to below the upper end thereof which upper end has openings to atmosphere.

These and other objects and features of the invention are hereinafter more fully described and claimed and a vacuum breaker embodying my invention is shown in the accompanying drawing in which—

Fig. 1 is a plan view of my improved vacuum breaker.

Fig. 2 is a vertical section through the said vacuum breaker as constructed for both hot and cold water inlets.

Fig. 3 is an elevational view showing the vacuum breaker connected with a fixture in which the inlet thereto is submerged.

In water supply systems there are many installations for instance in hospitals where bed pans and surgical instruments, etc. require to be cleaned and are usually washed in the water in a tank or container supplied by a conduit opening thereto below the liquid level in the container. Under such condition the opening of a faucet at a point in the water supply conduit below the liquid level in the container tends to cause a vacuum in the supply conduit whereby the contaminated water is drawn from the container into the supply conduits of the system. Thus the water in supply conduits of the installation becomes contaminated tending to infect individuals using the water from the supply line.

The present invention seeks to eliminate contamination of the water supply line in any installation where the inlet to the container is submerged and for this purpose a vacuum breaker, as shown in elevational view in Fig. 3, is provided. The vacuum breaker, according to my invention, consists of a hollow body 1 here shown as being of conelike form with the small end connected to the outlet 2 through which water is to be supplied to the bottom of the tank or container 3 or other point below the liquid level in the container.

In the form of the invention shown in Figs. 2 and 3 a hot water conduit 4 and a cold water conduit 5 respectively lead into chambers 4a and 5a at the upper end of the hollow cone like portion 1. In the bottom of the chamber 4a is a tube 6 and leading from the bottom of the chamber 5a is a tube 7. In the construction here shown the upper end of each tube opening to the bottom of the respective chamber is flared at 8 to provide a seat for the cone end 9 formed on the vertically adjustable screw 10. The chamber 5a and tube 7 is provided with a similar screw 11 having the cone end seat in the upper end of the tube 7. These screws provide a means for closing either or both valves to flow therethrough when desired and are each provided with a lock nut 12 and 13 respectively to vary the position of the valve ends in respect to the upper ends of the tubes 6 and 7. In Fig. 2 the incoming hot and cold water lines 4 and 5 are shown in a vertical position and in Fig. 3 in a horizontal position and it is therefore evident that it is not material to this invention as to how the supply conduits extend in relation to the vacuum breaker proper. These water supply conduits are respectively controlled by the valves 14 and 15.

As will be understood clearly from Fig. 2 the small end of the cone element 1 is attached to a vertical conduit 2 and the liquid through either or both the supply conduits 4 and 5 is discharged through the chambers 4a and 5a and tubes 6 and 7 to the discharge conduit 2 which provides the intake conduit for the tank or container 3.

The upper end of the cone element has apertures 16 about a portion of the periphery thereof as will be understood from Fig. 1 and from which figure it will be realized that the rear face 17 is a flat surface for fitting against a wall or partition through which conduits 4 and 5 may extend for connection to the vacuum breaker. The apertures 16 of the cone like element 1 are materially above the discharge end of the tubes 6 and 7 and with this arrangement the opening of a valve, as for instance the valve 18 in a conduit 19 forming part of the water supply system, the tendency to draw water from the conduit 2 leading to the tank 3 is prevented as no vacuum can be produced in the line 2 to cause suction of the liquid from the container 3 as such an effect is prevented due to air flowing into the apertures 16 above the liquid level.

I have shown the valves in the form of screws 10 and 11 having cone ends for varying the position of the cone end in respect to the upper flared ends of the tubes 6 and 7. These screws are varied in position in respect to the upper ends of the tubes to compensate for variable head pressures in the water supply lines in various installations, the valves being more nearly closed under high head pressure and spaced more distantly under low head pressure. Thus the device is adapted for use in water supply systems having various head pressures.

It is believed evident from the foregoing description that the device, according to my invention, is efficient in operation and of simple and inexpensive construction and that the various features and objects of the invention are attained by the construction described. It is also pointed out that various changes and modifications may be made in the structures without departing from the spirit and scope of the invention as defined by the appended claims.

Having thus fully described my invention, its utility and mode of operation, what I claim and desire to secure by Letters Patent of the United States is:

1. A vacuum breaker for the purpose described comprising a body having a pair of upper chambers side by side and a lower chamber separated therefrom by an integral transverse wall, the upper chambers each being adapted for independent connection with a liquid supply conduit of a water system and the lower chamber being adapted for connection at its lower end to a discharge conduit and having an opening to atmosphere above the lower end, the transverse wall having an aperture for each upper chamber, a tubular member supported in each of said apertures and open at its upper end to the respective upper chamber and extending into the lower chamber to a point below the opening therein to atmosphere and a valve in each upper chamber manually adjustable toward or from the end of the respective tubular member thereby adapting the device for use in water systems subject to different head pressures.

2. A vacuum breaker for the purpose described, comprising a hollow body having a transverse wall providing a lower chamber of a cone form with the larger end uppermost and a pair of upper chambers vertically thereabove, a transverse wall separating the said upper chambers and the lower chamber and having an opening to each upper chamber, a tube for each of the upper chambers having its upper end secured in the said opening of the respective chamber and extending therebelow to near the lower end of the lower chamber, the lower chamber having a series of openings to atmosphere at the upper end beneath the transverse wall, each of the upper chambers being adapted for connection of a conduit therewith for discharge of liquid through the device and the lower chamber being adapted for connection at its lower end to the submerged water inlet of a plumbing fixture, and a valve means for each of said tubes operable from the exterior of the body for varying the area of the opening of the tube to the respective upper chamber.

EDWARD W. N. BOOSEY.